United States Patent
Silvestri et al.

(10) Patent No.: US 11,386,425 B2
(45) Date of Patent: Jul. 12, 2022

(54) MULTIPLE MICROPROCESSOR ARCHITECTURE FOR COLD STORAGE

(71) Applicant: iCoin Technology, Inc., Campbell, CA (US)

(72) Inventors: Chester Silvestri, Campbell, CA (US); Adam Silvestri, Campbell, CA (US)

(73) Assignee: iCoin Technology, Inc., Campbell, CA (US)

( * ) Notice: Subject to any disclaimer, the term of this patent is extended or adjusted under 35 U.S.C. 154(b) by 291 days.

(21) Appl. No.: 16/892,480

(22) Filed: Jun. 4, 2020

(65) Prior Publication Data

US 2021/0383376 A1 Dec. 9, 2021

(51) Int. Cl.
*G06Q 20/00* (2012.01)
*G06Q 20/38* (2012.01)
(Continued)

(52) U.S. Cl.
CPC ..... *G06Q 20/3829* (2013.01); *G06F 16/2379* (2019.01); *G06Q 20/065* (2013.01);
(Continued)

(58) Field of Classification Search
CPC ............. G06Q 20/3829; G06Q 20/065; G06Q 20/3276; G06Q 20/3678; G06Q 20/3825;
(Continued)

(56) References Cited

U.S. PATENT DOCUMENTS

2014/0219443 A1 8/2014 Edouard
2015/0324789 A1 11/2015 Dvorak

FOREIGN PATENT DOCUMENTS

CN 113971562 A * 1/2022
KR 101339382 B1 1/2014
(Continued)

OTHER PUBLICATIONS

Foreign Han Reference included PDF (Year: 2022).*
(Continued)

*Primary Examiner* — Dante Ravetti
(74) *Attorney, Agent, or Firm* — McDonnell Boehnen Hulbert & Berghoff LLP

(57) ABSTRACT

Examples relate to multiple microprocessor architecture for cold storage of digital currency. A hardware wallet may include a first microprocessor configured to establish a secure connection with a mobile device connected to a network having access to a blockchain and a second microprocessor configured to generate a private key and a public key for communication of transaction data onto the blockchain. The second microprocessor may initially use a hash function and the private key to encrypt the transaction data and produce a digital signature independent from the first microprocessor and subsequently provide the digital signature and the public key to the first microprocessor for communication onto the blockchain via the secure wireless connection with the mobile device. The second microprocessor may also encrypt and store the private key securely within the wallet's memory such that the private key is readable only by the second microprocessor.

19 Claims, 12 Drawing Sheets

(51) Int. Cl.
*G06F 16/23* (2019.01)
*H04L 9/06* (2006.01)
*H04L 9/32* (2006.01)
*H04L 9/30* (2006.01)
*G06Q 20/36* (2012.01)
*G06Q 20/06* (2012.01)
*G06Q 20/32* (2012.01)
*H04L 9/08* (2006.01)
*H04W 12/033* (2021.01)
*H04L 9/00* (2022.01)

(52) U.S. Cl.
CPC ..... *G06Q 20/3276* (2013.01); *G06Q 20/3678* (2013.01); *G06Q 20/3825* (2013.01); *H04L 9/0643* (2013.01); *H04L 9/0869* (2013.01); *H04L 9/3073* (2013.01); *H04L 9/3247* (2013.01); *H04W 12/033* (2021.01); *G06Q 2220/00* (2013.01); *H04L 9/50* (2022.05); *H04L 2209/56* (2013.01)

(58) Field of Classification Search
CPC ........... G06Q 2220/00; G06Q 20/3226; G06Q 20/3674; G06F 16/2379; H04L 9/0643; H04L 9/0869; H04L 9/3073; H04L 9/3247; H04L 9/50; H04L 2209/56; H04L 9/0822; H04L 9/0861; H04L 9/0897; H04L 9/3239; H04L 2209/80; H04W 12/033; H04W 12/03; H04W 12/108; H04W 12/50; H04W 12/77
USPC .................................. 705/16, 21, 59; 380/44
See application file for complete search history.

(56) References Cited

FOREIGN PATENT DOCUMENTS

| KR | 1020200041607 A | 4/2020 |
|----|-----------------|--------|
| WO | 2019159172 A1   | 8/2019 |

OTHER PUBLICATIONS

International Search Report and Written Opinion for corresponding PCT application No. PCT/US2021/035349 dated Sep. 17, 2021.

* cited by examiner

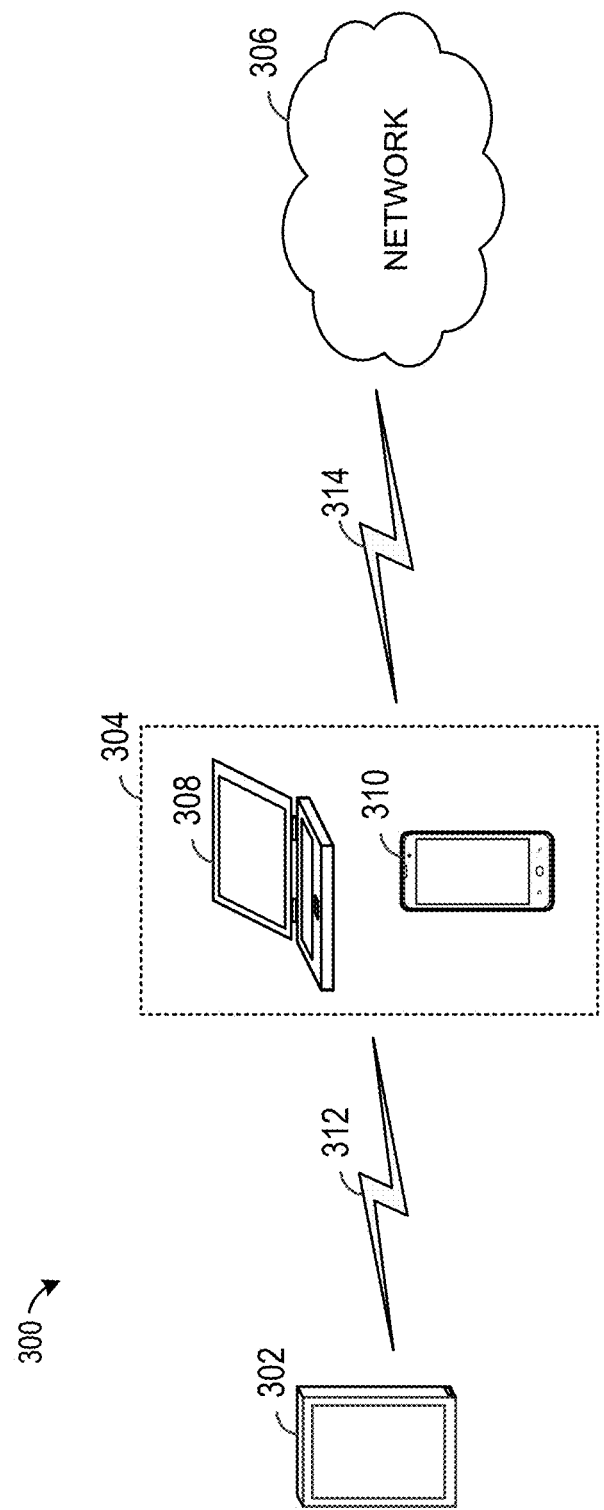

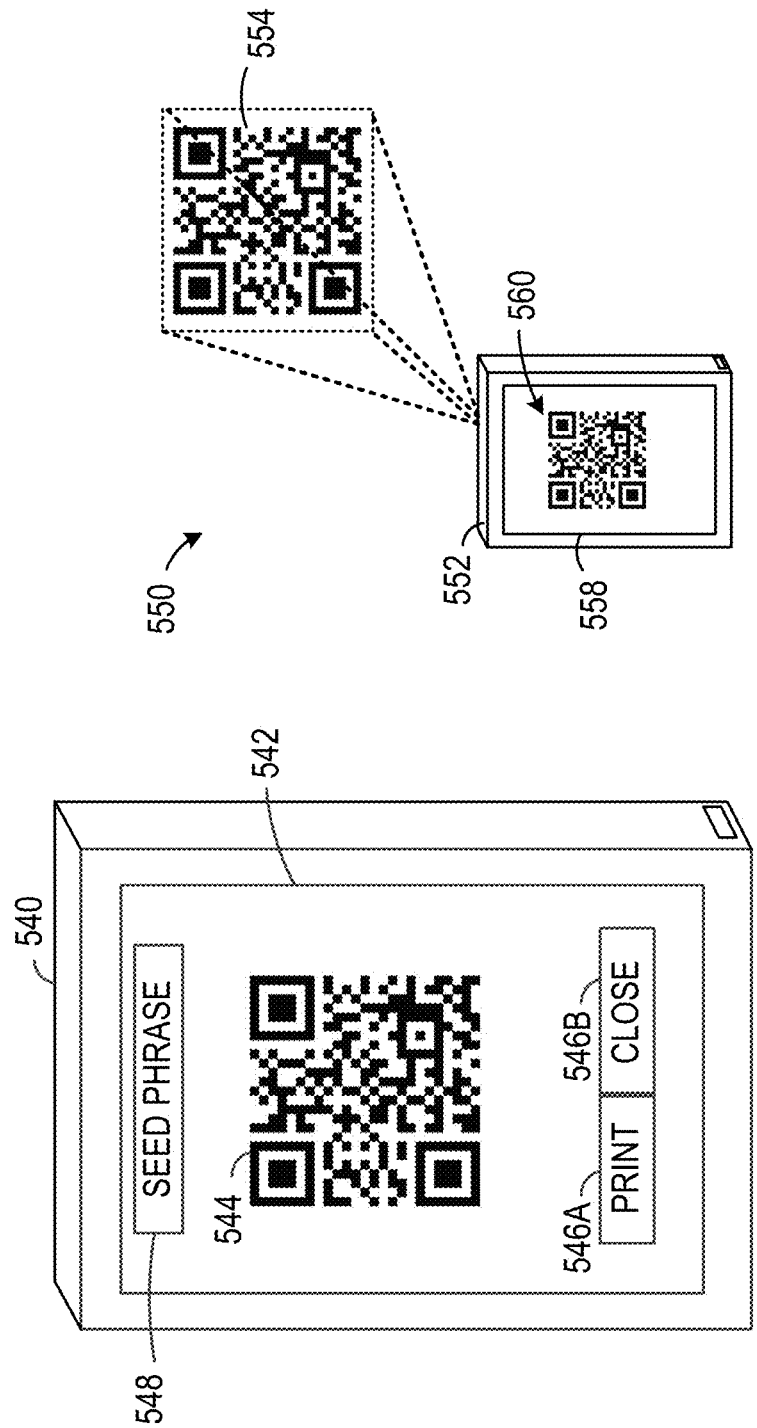

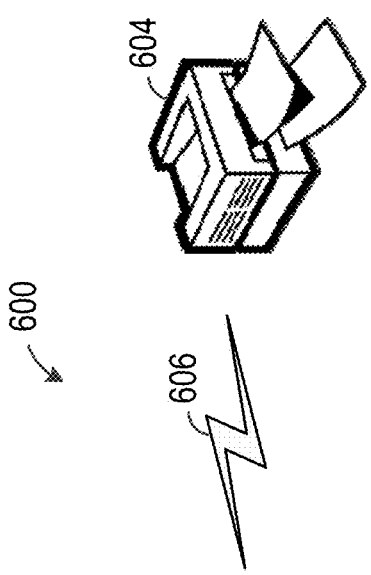
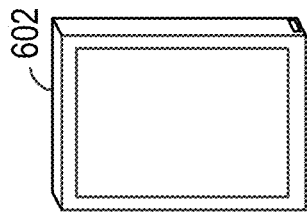
FIGURE 6A
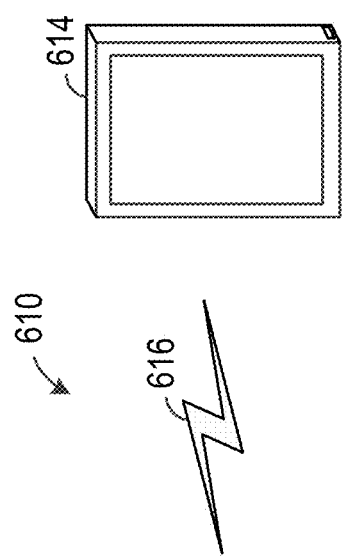
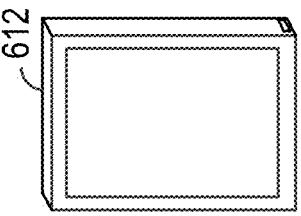
FIGURE 6B

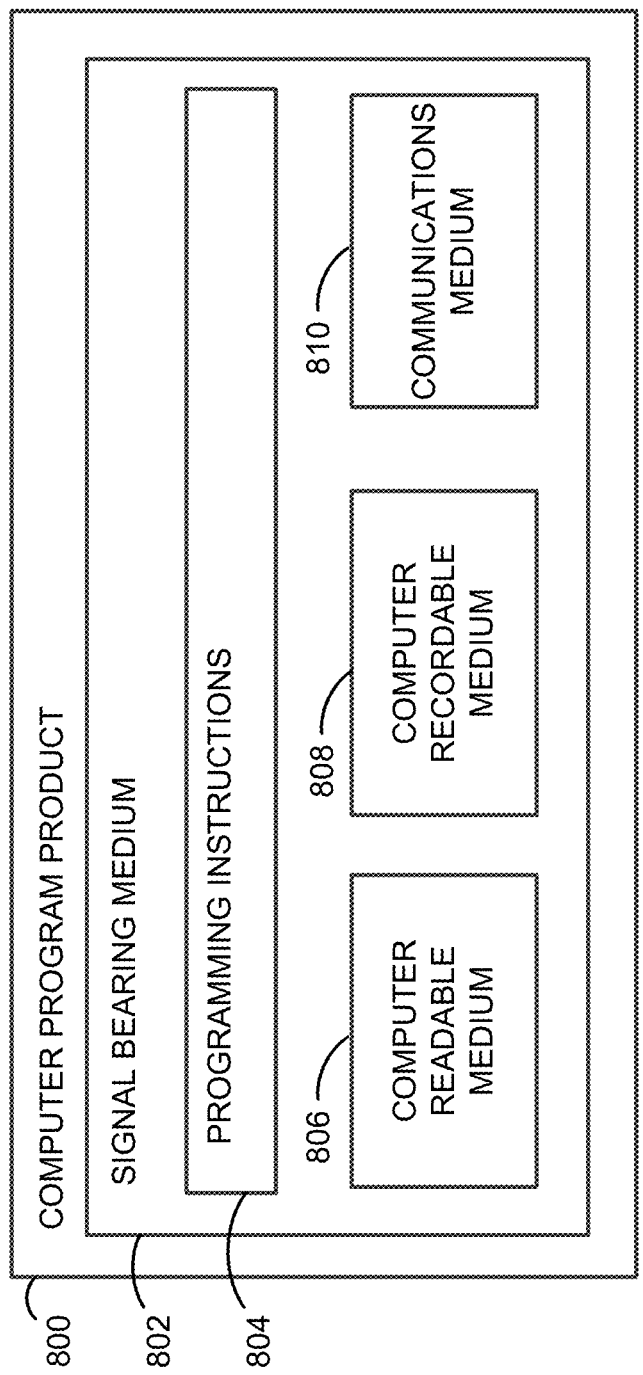

MULTIPLE MICROPROCESSOR ARCHITECTURE FOR COLD STORAGE

BACKGROUND

A digital currency wallet, also referred to as a cryptocurrency wallet, is a secure wallet designed to enable storage and transactions for one or more digital currencies. For instance, the wallet may provide software that allows a user to check balances and make transactions for a digital currency, such as Bitcoin and Ethereum, among others. To perform these operations, a public address for a given type of digital currency is stored in the digital currency wallet. Similar to an account number, the public address can be shared publically to enable transactions (e.g., sending, receiving) for the particular type of digital currency to be recorded on the ledger for the digital currency (e.g., the corresponding blockchain). For example, a wallet configured for Bitcoins includes a public Bitcoin address that can be shared to enable sending or receiving Bitcoin with other wallets. To prove ownership of a particular public address, a wallet can generate and store a private key (i.e., a secret code) that can be used to digitally sign transactions submitted to the ledger of a digital currency. For example, the wallet configured for Bitcoin may include a private key that can be used to sign transactions for review by validating nodes that support the Bitcoin's blockchain. Thus, a digital currency wallet operates similar to an online bank account where a digital currency public address is the account number, a private key for the public address is the user's secret pin, and the ledger (e.g., the blockchain) for the digital currency records transactions similar to a bank's ledger.

Digital currency wallets exist in different formats, including online-only, offline, mobile, hardware, paper, and desktop. Each wallet is categorized based on factors, such as the medium used to store the wallet, how the wallet is controlled, and whether the wallet's data is stored online or offline. In addition, some digital currency wallets enable a user to access stored content in multiple ways (e.g., desktop and mobile applications).

Among the different types available, users often use a hardware wallet for long term storage of digital currency data since the hardware wallet can store the data offline (i.e., in cold storage) and limit exposure to hackers, viruses, and other online-based attacks. By storing digital currency data offline, the hardware wallet can provide a level of security that surpasses the protection offered by digital currency wallets with network connections (i.e., hot wallets). Many hardware wallets, however, are often difficult to use due to limited interfaces with small buttons, minimal displays (if any), and sparse software that can make digital currency storage and use complicated for the user. Thus, there is a demand for easy-to-use hardware wallets that provide secure cold storage for digital currencies.

SUMMARY

In one aspect, the present application describes a hardware wallet. The hardware wallet includes a first microprocessor configured to establish a secure wireless connection with a mobile device. The mobile device is connected to a network having access to a blockchain corresponding to a digital currency. The hardware wallet also includes a second microprocessor configured to generate a private key and a public key for communication of transaction data onto the blockchain. The second microprocessor is further configured to use a hash function and the private key to encrypt transaction data and produce a digital signature independent from the first microprocessor, and subsequently provide the digital signature and the public key to the first microprocessor for communication onto the blockchain via the secure wireless connection with the mobile device. The hardware wallet also includes a memory. The second microprocessor encrypts and stores the private key securely within the memory such that the private key is readable only by the second microprocessor.

In another aspect, the present application describes a system. The system includes a mobile device connected to a network. The network includes access to a blockchain corresponding to a digital currency. The system also includes a hardware wallet having a first microprocessor, a second microprocessor, and a memory. The first microprocessor is configured to establish a secure connection with the mobile device and the second microprocessor is configured to generate a private key and a public key that enable communication of transaction data onto the blockchain. The second microprocessor is further configured to use a hash function and the private key to encrypt transaction data and produce a digital signature independent from the first microprocessor, and subsequently provide the digital signature and the public key to the first microprocessor for communication onto the blockchain via the secure wireless connection with the mobile device. In addition, the second microprocessor encrypts and stores the private key securely within the memory such that the private key is readable only by the second microprocessor.

In yet another example, the present application describes a method. The method involves establishing, by a first microprocessor from a hardware wallet, a secure wireless connection with a mobile device. The mobile device is connected to a network having access to a blockchain corresponding to a digital currency. The method further involves generating, by a second microprocessor from the hardware wallet, a private key and a public key for communication of transaction data onto the blockchain. The second microprocessor uses a hash function and the private key to encrypt transaction data and produce a digital signature independent from the first microprocessor. The method also involves responsive to generating the private key and the public key, providing, by the second microprocessor and to the first microprocessor, the digital signature, and the public key to the first microprocessor for communication onto the blockchain via the secure wireless connection with the mobile device. The method further involves communicating, by the first microprocessor, the transaction data, the digital signature, and the public key to the blockchain corresponding to the digital currency In a further example, the present application describes a non-transitory computer-readable medium configured to store instructions, that when executed by a hardware wallet comprising at least a first microprocessor and a second microprocessor, causes the hardware wallet to perform the operations of the method described above.

In yet another example, the present application described a system with means for performing operations of the method described above.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 is a block diagram illustrating a blockchain wallet system, according to one or more example embodiments.

FIG. 5C illustrates a graphical user interface displaying the seed phrase as a Quick Response (QR) code, according to one or more example embodiments.

FIG. 5D illustrates a hardware wallet scanning a QR code, according to one or more example embodiments.

FIG. 6A depicts a system for secure communication between a hardware wallet and a peripheral device, according to one or more example embodiments.

FIG. 6B depicts another system for secure communication between hardware wallets, according to one or more example embodiments.

FIG. 8 illustrates a schematic diagram of a computer program, according to example embodiments.

DETAILED DESCRIPTION

Figure 1:
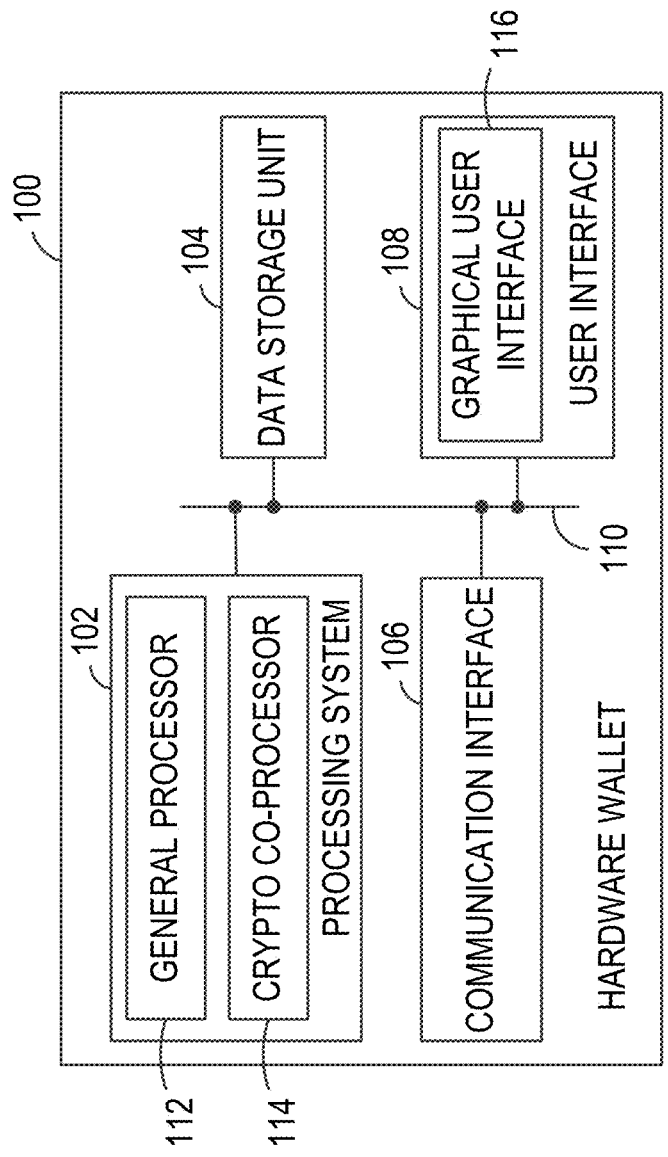
FIG. 1 is a block diagram for a hardware wallet, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example hardware wallets and blockchain wallet systems presented herein incorporate user interface and security features that simplify user experience and increase security. As a tool for implementing digital currency transactions and storing data, example hardware wallets can have a transportable and secure form factor with one or more built-in graphical user interfaces (GUIs) configured to receive touch input controls. For instance, a hardware wallet may include a single large GUI that spans across a front surface of the wallet's housing in a manner similar to a tablet or smartphone. Each GUI may include a tactile user interface (UI) and a visual UI capable of displaying color graphics to enable a user to quickly check balances, execute digital currency transactions, and perform other operations using the hardware wallet.

Some example hardware wallets presented herein can also include other hardware and software elements that can simplify and enhance the user's experience. For example, a hardware wallet may include one or more speakers that can be used to provide audio alerts and voice instructions. Similarly, a hardware wallet may also include one or more cameras that can capture images, scan QR codes, and detect a user for a facial recognition process, among others potential actions. One or more biometric sensors can also be incorporated into a hardware wallet. For instance, a fingerprint scanner can be used to enhance the wallet's security. Example hardware wallets can also include one or more microphones configured to detect external audio, such as voice inputs from a user.

In addition, some hardware wallets described herein also incorporate one or more communication technologies that can enable connections with external devices. Example external devices may include, but are not limited to, other hardware wallets, desktop computers, smartphones, tablets, laptops, wearable computing devices (e.g., glasses, watches), printers, scanners, cameras, microphones, storage drives, and user interface elements (e.g., a keyboard and mouse). The communication technologies may include wired components that can physically connect the hardware wallet to another device. Example wired components include, but are not limited to, Universal Serial Bus (USB), Ethernet, and High-Definition Multimedia Interface (HDMI). A hardware wallet may also include one or more wireless communication technologies to establish secure connections, such as Bluetooth, Bluetooth Low Energy (BLE), Near Field Communication (NFC), and a Wi-Fi component, among others. In some embodiments, a hardware wallet may include a physical off-switch that can be used to prevent use of one or more wireless communication technologies and increase security from potential hackers or other network threats.

As discussed above, a hardware wallet described herein may incorporate security features that can boost digital currency data and general data protection, including during cold storage. Some example hardware wallets are designed without a network component (e.g., a Wi-Fi component) that enables the hardware wallet to directly connect to an external network, such as the Internet. Rather, the hardware wallet can be designed to require the formation of an indirect connection through another device (e.g., a mobile device) to communicate transactions to a digital currency's ledger (e.g., blockchain) and generally connect the network. In particular, the hardware wallet may be able directly connect with a mobile client with companion software, which in turn enables the hardware wallet to establish a temporary connection to the network through the mobile client's network connection.

By way of an example, the hardware wallet may send digital currency or other data to the mobile client for communication to the network (e.g., onto the blockchain). The hardware wallet may securely provide the digital currency or data using a wired connection, a secure wireless connection, or another process (e.g., QR code scanning) to the mobile client. The mobile client can subsequently execute transactions (e.g., send and receive) digital currency or perform other actions as per the user's instructions. In addition, the mobile client can also relay data (e.g., transactions) back to the hardware wallet safely and securely through the connection between the mobile client and the hardware wallet. This way, the mobile client can serve as a firewall that helps prevent viruses, hackers, and malicious network-based attacks from reaching the contents of the hardware wallet. After the one or more transactions are initiated (or completed), the user may disconnect the hardware wallet from the mobile client and cause the hardware wallet to switch back to completely offline and resume storing the modified digital currency data in cold storage. In some examples, a hardware wallet may automatically switch to back offline upon using the indirect connection to perform the necessary actions to implement the user's transactions. This can prevent situations where the hardware wallet is left connected to the mobile client and exposed indirectly to the network (e.g., the Internet).

In some embodiments, the hardware wallet includes a network component that can enable the hardware wallet to directly connect to an external network (e.g., the Internet). A user may use the hardware wallet to directly conduct transactions or share data with other devices. For example, the hardware wallet can connect to a digital currency exchange and enable trading on the exchange through the hardware wallet. In some instances, when the hardware wallet includes a network component, the hardware wallet may further include a physical switch that can be used to disable the network component to enable the user to transition the hardware wallet completely offline. The physical switch may require a subsequent physical input to enable the network component to operate again when the user wants to execute another transaction to the network.

To further add additional security, some example hardware wallets presented herein perform operations using a processing system configured with multiple processing units. A processing unit may correspond to a processor, microprocessor, microcontroller, or other hardware capable of performing operations described herein. As such, the inclusion of multiple processing units within a hardware wallet's processing system can allow operations to be performed in different ways. For instance, multiple processors can be used to perform operations in a redundant arrangement (e.g., two or more processing units executing the same operation) and/or a parallel processing arrangement. In particular, parallel processing can enable the hardware wallet to efficiently perform operations that require substantial computing resources. In addition, multiple processing units can also enable a failed processing unit to be replaced by another processing unit without requiring repair on the hardware wallet. Multiple processing units can increase the hardware wallet's operations in other ways too. The GUI(s) may operate using one or more graphical processing units (GPUs) while other operations are executed by one or more central processing units (CPUs).

In some embodiments, multiple processing units can increase a hardware wallet's security by enabling the processing system to assign and isolate specific operations for performance by particular processing units. For example, operations executed by the hardware wallet can be divided among processing units to enable at least one processing unit to specialize in encryption and digital currency-related operations, such as the generation of key pairs and the encryption and storage of private keys. A processing unit tasked with performing these specialized operations can be referred to herein as a crypto co-processor (CCP). To increase security, wallet operations not assigned to the CCP can be performed by at least one other processing unit (e.g., a general processing unit). Such a configuration can allow operations to be separated with one or more CCPs used in a limited way to securely protect particular operations, such as encryption and digital currency-related information.

In addition, the interaction between general processors and CCPs can be limited to further increase security. By limiting interaction between processing units, a specialized processing unit (e.g. a CCP) can generate and provide specialized data (e.g., a digital signature and transaction data) to other processing units (e.g., a general processing unit) for communication to the blockchain without exposing unencrypted data to the other processing units. As such, a CCP may securely store private keys in an encrypted or unencrypted format locally at the CCP without other processing unitse having access.

In some examples, memory within the hardware wallet can also be divided and accessible (e.g., readable) only by certain processing units within examples. For example, some memory within a hardware wallet may only be readable by one or more designated processing units (e.g., a CCP). This can enable the CCP to store private keys and other sensitive information securely without other processing units (or components in general) having access. In some embodiments, each processing unit may have individual memory that is accessible only by that processing unit. For instance, the CCP may have exclusive memory that is only readable and writable by the CCP.

Within embodiments, the assignment of tasks at processing units and the abilities of each processing unit may vary. In some examples, the power consumption by the processing units may depend on the tasks assigned to each processing unit. For example, a CCP configured to perform intensive encryption and hashing processes may consume power at an increased level to enable efficient execution by the hardware wallet when implementing transactions. In addition, the processing system within a hardware wallet may incorporate a master/slave arrangement for distribution of operations.

Another security feature that an example hardware wallet may include involves using an inertial measurement unit (IMU) that can measure changes in the position and orientation of the hardware wallet. The hardware wallet may enable a user to set instructions that execute based on measured motions of the hardware wallet. For example, the user may use the GUI to cause the hardware wallet to delete contents if the IMU detects a change in the hardware wallet's position beyond a threshold distance without any entry of a security pin code or password. This feature can help a user protect sensitive information and digital currency stored offline. The hardware wallet can also include a global positioning system (GPS) component that could offer security options for the user similar to the IMU.

Example hardware wallets can operate within advanced blockchain wallet systems presented herein. The, components, abilities, and features of a wallet system can vary based on the abilities of the hardware wallet. A wallet system may involve a hardware wallet, mobile client, and/or a network to enable transactions to be communicated to the ledger of a digital currency. In some embodiments, the hardware wallet may connect to a mobile client with companion software designed to enable the user to provide instructions via the mobile client's instructions that cause one or more processors at the hardware wallet to perform operations in response. For example, a general processing unit at the hardware unit may be configured to establish a connection with the mobile client or another device using one or more wireless technologies.

The user may use the hardware wallet, the mobile client, or a combination to initiate and secure a connection between the components within the wallet system. For instance, the mobile client may execute an application that enables a wireless connection to be secured with the hardware wallet. In another example, the user may use the GUI of the hardware wallet to provide instructions that cause a general processing unit of the hardware wallet to initiate and establish a connection with the mobile client. In further examples, the wallet system may use a multiple-factor security feature that uses both the hardware wallet and the mobile client to require inputs to ensure a secure connection when the connection is wireless. For instance, the wallet system may require a physical entry of a code on one or both devices. The wallet system may also require the mobile client to use its camera to scan a security image (e.g., a QR code) displayed on the GUI of the hardware wallet to establish a secure wireless connection between the hardware wallet and the mobile client.

In some embodiments, the hardware wallet may use near field communication technology, Bluetooth or BLE, or other wireless technology to establish a secure wireless connection with the mobile client and other peripheral devices, such as printers, cameras, scanners, monitors, keyboards, memory (e.g., external storage), and other user interface elements. The wireless connection may enable data to be encrypted and transferred between devices. In other embodiments, the hardware wallet may connect via a wired connection requiring proximity between the devices.

Referring now to the figures, FIG. 1 is a functional block diagram illustrating a hardware wallet according to one or more example embodiments. The hardware wallet 100 may perform various acts and functions, such as those described in this disclosure. As shown in FIG. 1, the hardware wallet 100 includes processing system 102, a data storage unit 104, a communication interface 106, and a user interface 108. These components can be connected to each other via a connection mechanism 110. The hardware wallet may include more or fewer components in other embodiments.

The hardware wallet 100 can generate and store cryptographic keys used to create or modify the ledger of a digital currency. Particularly, the hardware wallet 100 may provide cold storage in an absolute offline state that reduces exposure of stored digital currency data less susceptible to vulnerabilities that arise from network connections, such as viruses and other malicious code typically deployed to devices via the Internet. As a result, the hardware wallet 100 can achieve a much greater degree of key protection and security that surpasses other standalone software wallets that operate on computers, browsers, and mobile clients (e.g., smartphones) that are Internet-capable.

As shown in FIG. 1, the hardware wallet 100 includes processing system 102, which may include one or more processing units (e.g., processors, microprocessors) configured to perform one or more operations. For instance, the processing system 102 can include one or more general-purpose processors and/or special-purpose processors (e.g., a digital signal processor (DSP)). The quantity and types can vary and may include CPUs, GPUs, microprocessors, and microcontrollers, among others. As such, the processing system 102 may execute operations, including processing data obtained from other components within the hardware wallet 100 and other sources.

In the embodiment shown in FIG. 1, the processing system 102 includes a general processor 112 and a CCP 114. By including multiple processing units, the processing system 102 can strategically use individual processing units to perform operations in different ways, such as in a parallel or redundant arrangement.

The operations designated for the processing system 102 can be divided and isolated across processing units in a way that can boost overall security of the hardware wallet 100. Although the embodiment depicted in FIG. 1 includes a general processor 112 and a CCP 114, the processing system 102 can include other quantities of processing units. For example, the hardware wallet 100 can include multiple CCPs with each CCP assigned to perform operations specific to a particular type of digital currency (e.g., a first CCP for Bitcoin and a second CCP for Ethereum).

In some embodiments, the processing system 102 is implemented on a single semiconductor chip (e.g., a system on chip (SOC) configuration). For instance, the general processor 112 and the CCP 114 can be collocated on the same semiconductor chip. The semiconductor chip may further incorporate advanced key protection techniques, such as die shielding and other anti-tampering circuitry. In other embodiments, the hardware wallet 100 may include processing units arranged on different semiconductor chips. For instance, each chip may include memory specific to the processing units on that chip.

The general processor 112 and the CCP 114 can be used to perform operations for the hardware wallet 100 in various ways, such as parallel processing, in a redundant arrangement, and/or for specific operations. For example, the general processor 112 may represent one or more processing units tasked with performing general system operations and the CCP 114 may represent one or more processing units tasked with performing specific digital currency operations.

By way of an example, the general processor 112 may be configured to facilitate connections with external devices, such as other hardware wallets, mobile clients, desktop computing devices, cameras, scanners, monitors, keyboards, computer mice, and printers, among others. The connections may be securely established via wired or wireless communications using the communication interface 106. In addition, the hardware wallet 100 may require user approval prior to establishing a connection between the hardware wallet 100 and an external device. For example, the general processor 112 may establish a secure wireless connection with a mobile client operating software compatible with the hardware wallet 100 after receiving instructions from the user via the GUI 116.

By way of another example, the general processor 112 may connect directly to a printer to print data directly from the hardware wallet 100. Data may include seed phrases, account addresses, transaction receipts, and/or other information stored by a user. For example, the general processor 112 may obtain the wallet's seed phrase from the CCP 114 and enable the user to print the seed phrase as words, words and images, or a QR code through a direct connection between the hardware wallet 100 and the printer established using secure wireless or wired technologies within the wallet's communication interface 106. When the seed phrase is in the format of a QR code, the hardware wallet 100 can use a camera 205, 2016 to scan and read the QR code in order to restore contents of the hardware wallet 100 rather than requiring the user to manually input the 24 words of the seed phrase via text or voice inputs. The general processor 112 may also perform other system-based operations, such as executing processes based on user inputs and facilitating security features (e.g., pin code or password entry).

In some embodiments, the general processor 112 may facilitate the reception and installation of firmware updates for the hardware wallet 100. For instance, the general processor 112 may establish a secure connection that enables the hardware wallet 100 to wirelessly receive the update. The general processor 112 may initiate and execute installation upon determining that the update is valid. As an example, new factory software can be encrypted and hashed before a mobile client is able to download and transmit the software to the hardware wallet. As such, the general processor 112 may establish a secure connection that enables the transfer of the software download from the mobile client to the hardware wallet and also analyze the encrypted and hashed download for validity prior to initiating the update. For instance, the general processor 112 may analyze the hashes within the download to check for tampering or changes that may have occurred during transmission. In addition, the general processor 112 may check for a wallet serial number or identification within the download to ensure that the download is for the hardware wallet 100.

By way of another example, the CCP 114 may perform operations specifically related to one or more digital currencies, such as the generation of asymmetric key pairs or symmetric keys using one or more key generation processes. For example, the CCP 114 may use a high entropy random number generator to generate private keys with enhanced security. In another example, the CCP 114 may generate the private key and the public key using elliptic curve cryptography, which enables public-key cryptography based on the algebraic structure of elliptic curves over finite fields. The private and public keys could also be generated as QR codes. Private keys can be isolated by the CCP 114 from other components (e.g., the general processor 112) within the hardware wallet 100. In addition, the CCP 114 may use SHA-256 and/or other hashing functions to generate blockchain transaction data and digital signatures.

In some examples, the CCP 114 is configured to generate an unlimited number of keys using an unlimited number of formats. For instance, the CCP 114 can encrypt the keys and use an unlimited amount of external memory to store one or more keys along with other encrypted data files. The CCP 114 can be configured to operate one or more operating systems dedicated to running the cryptographic applications that are using the CCP 114 as a decided system and not capable of running general third party applications that can be installed or downloaded by the user.

In addition, the CCP 114 can contain a permanent, unchangeable digital address to uniquely identify the hardware wallet 100. The CCP 114 may use the digital address without exposing the personal contact information of the user. For instance, the CCP 114 may use the digital address to prove ownership of transactions or cloud files and to prevent "data gathering" by third parties. In some examples, the CCP 114 may output the digital address as a QR code.

The general processor 112 and the CCP 114 can perform operations in parallel, which can enable the hardware wallet 100 to operate efficiently in response to user inputs. For example, the CCP 114 may generate and export public keys, digital signatures, and blockchain account addresses to the general processor 112 to enable the general processor 112 to subsequently communicate transactions with the required digital signatures to the blockchain through a mobile client connection via the communication interface 106. As shown, the multiple processing units can enables the CCP 114 to keep unencrypted private keys protected and isolated from the general processor 112 while the general processor 112 allows external communication with the mobile client.

In addition, the combination of multiple processors can also enable secure boot up processes by the hardware wallet 100. For example, one or more processors can execute a system check when the hardware wallet 100 is powered on. A stored hash of the original firmware can be compared each time to ensure that there has been no tampering of the hardware wallet 100. The hardware wallet 100 can also support a partial secure boot. In particular, the boot code may be divided into multiple parts and the individual parts can then be separately checked to reduce the latency at start up. A random number generator can also be used each time to vary the order in which each section of code is checked.

The data storage unit 104 may include one or more volatile, non-volatile, removable, and/or non-removable storage components, such as magnetic, optical, or flash storage, and/or can be integrated, in whole or in part, with the processing system 102. As such, the data storage unit 104 may take the form of a non-transitory computer-readable storage medium, having stored thereon program instructions (e.g., compiled or non-compiled program logic and/or machine code) that, when executed by one or more processing system 102, cause the hardware wallet 100 to perform one or more acts and/or functions, such as those described in this disclosure. Such program instructions can define and/or be part of a discrete software application. In some instances, one or more processing system 102 can execute program instructions in response to receiving an input, such as from the communication interface 106 or the user interface 108. The data storage unit 104 may also store other types of data, such as those types described in this disclosure.

In some embodiments, the data storage unit 104 can be distributed across different physical units of memory. The hardware wallet 100 may use the data storage unit 104 for cold storage of one or more types of digital currency. The memory can be allocated in different ways. For instance, a portion of the memory can be used and accessed only by the CCP 114, which can enable the CCP 114 to store private keys and other sensitive information. Information can be encrypted for storage in the data storage unit 104.

The communication interface 106 can allow the hardware wallet 100 to connect to and/or communicate with another entity (e.g., a mobile device, another hardware wallet). In an example, the communication interface 106 can be a wired interface, such as an Ethernet interface, a high-definition serial-digital-interface (HD-SDI), USB, and/or HDMI. The communication interface 106 may also include one or more wireless technologies, such as Bluetooth, BLE, and/or NFC.

In order to interact with the blockchain of a digital currency or other wallets, the communication interface 106 can establish a connection to a network (e.g., the Internet) that can facilitate the interaction. In some examples, the hardware wallet 100 may establish a direct connection to the network. For instance, the communication interface 106 may include a Wi-Fi interface or another technology that can be used to connect the hardware wallet 100 to the network. In other examples, the hardware wallet 100 may establish an indirect connection to the network through another device (e.g., a computing system running companion software). The indirect connection may enable the hardware wallet 100 to cause the device to relay data to the network as instructed by the user. The companion software operating on the device (e.g., smartphone, wearable computing device) can provide access for transactions that involve contents of the hardware wallet 100. For instance, a user can enter transaction information via the mobile client, which the subsequently communicates the information to the hardware wallet 100. In some instances, the user can enter transaction information directly into the hardware wallet 100.

The hardware wallet 100 can use the transaction information to generate transaction data and digitally sign the transaction in a way that would be accepted by the blockchain validating nodes. In this example, the hardware wallet 100 could then transmit the signed transaction back to the mobile client, which would be used to send it over the communications network to the blockchain nodes. In particular, the mobile client can establish connections via the Internet and enable the hardware wallet 100 to avoid direct connections to the Internet, which can help prevent the hardware wallet 100 from potentially being impacted by a malicious code.

The user interface 108 can facilitate interactions for users and the platform interfaces implemented by the hardware wallet 100. As shown in FIG. 1, the hardware wallet 100 includes a GUI 116, which can be implemented as a display device combined with a touch-sensitive panel that can enable a user to provide inputs via touch-controls. For example, the GUI 116 may enable a user to provide touch-interface inputs that cause the device to initiate a transaction or a transfer of a stored digital currency to another device. For example, the GUI 116 can enable a user to enter transaction information to the hardware wallet 100 directly. In some embodiments, the hardware wallet 100 may include multiple GUIs, such as dual GUIs on one side or opposing sides of the hardware wallet 100.

In some embodiments, the GUI 116 may be used to display a seed phrase, which corresponds to a list of words that store all the information needed to recover digital currency stored on a hardware wallet. The GUI 116 may use a display interface of the device to simultaneously display all the words of the seed phrase. In some embodiments, the processing system 102 may access a dictionary of images to display images representing the seed phrase rather than words. For example, the GUI 116 may be used to display an order of images including an apple, a car, a football, etc. The GUI 116 can also display the seed phrase as a QR code or another format.

In addition, the GUI 116 may also be used to enable checking that blockchain account addresses or digital signature are not tampered or spoofed during the data entry or transmission to the blockchain. For example, a Bitcoin account address can be a combination of random digits, upper case and lower case letters arranged in a specific character order. To avoid malicious tampering or spoofing, a user might carefully check the full send and receive addresses at every stage of a transaction both on the mobile client and the hardware wallet. This process of reading long strings of characters can be tedious and error prone.

The hardware wallet 100 may translate these long character strings into sets of images derived via an image dictionary and displayable by the GUI 116. For example, if the user creates a new send or receive address on the hardware wallet 100, the hardware wallet 100 may provide the address to the network connected device (e.g., a mobile client), which can translate the address into an image using the same protocol as the hardware wallet 100. In addition, the GUI 116 may also display an image to represent the address. If the images on the network connected device and the GUI 116 match, the user knows that the address has not been tampered with. Thereafter, any changes to the send/receive address may cause the GUI 116 to display a different image (e.g., a car). In addition, this process works the other way around when the network connected device obtains a new send/receive address and provides the address to the hardware wallet 100. The use of images can quickly show if the address was tampered. By using the GUI 116, the hardware wallet 100 can increase security while also simplifying the overall process for the user. In particular, the hardware wallet 100 may create and use the images through the use of advanced mathematics and hashing without user involvement.

In other embodiments, the hardware wallet 100 may use other approaches, such as Sudoku style matrices or heat maps using numbers, colors, or black and white squares to simplify the comparison process. For example, the alphanumeric account address can be converted into colors, black and white squares, and/or Sudoku matrices on both the hardware wallet 100 and network connected device for a subsequent comparison. If the comparison shows that both devices match, the address has not been tampered with.

In other embodiments, the user interface 108 can include other components, such as one or more cameras, a speaker, an internal motion unit, one or more biometric sensors, and/or a haptic feedback system. More generally, the user interface 108 can include hardware and/or software components that facilitate interaction between the hardware wallet 100 and one or more users.

To further illustrate, the hardware wallet 100 may further include an IMU and/or a global positioning system. The IMU may enable a user to further increase the security associated with the hardware wallet 100. In particular, the hardware wallet 100 may enable the user to set a movement restriction for the hardware wallet 100 whereas the hardware wallet 100 deletes its contents if the movement restriction is violated within the input of a security code.

The connection mechanism 110 represents a mechanism that facilitates communication between two or more components. For instance, the connection mechanism 110 can be a cable or system bus. In some instances, the connection mechanism 110 can include a non-tangible medium (e.g., where the connection is wireless).

Figure 2B:
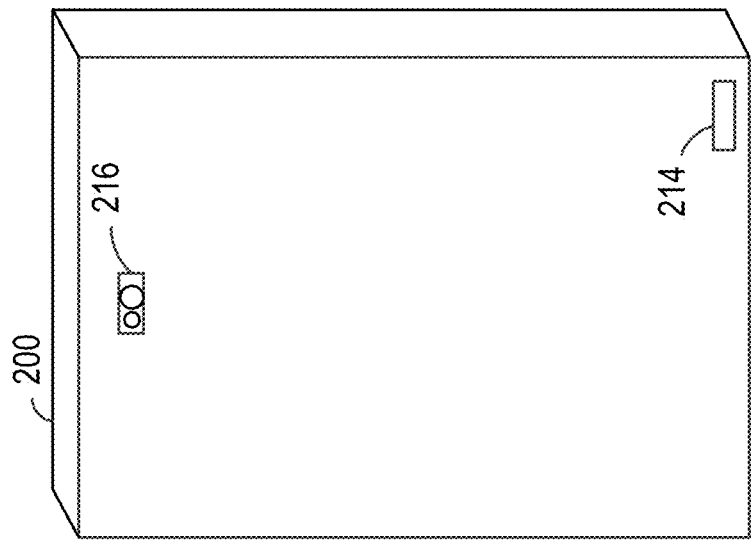
FIG. 2B depicts a back view of a hardware wallet, according to one or more example embodiments.
Figure 2A:
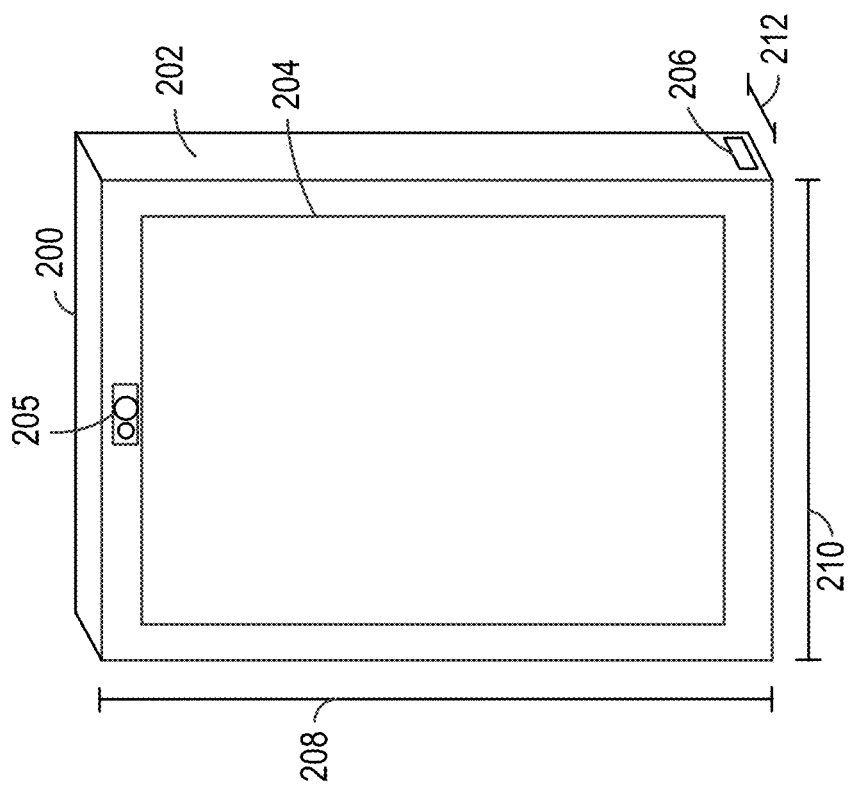
FIG. 2A depicts a front view of a hardware wallet, according to one or more example embodiments.

FIG. 2A depicts a front view of a hardware wallet for cold storage, according to one or more example embodiments. The hardware wallet 200 includes a housing 202, a GUI 204, a camera 205, and a USB port 206. In addition, the hardware wallet 200 may also include other components not shown in FIG. 2A, such as a battery system, a microphone, a speaker, a biometric sensor, and/or an IMU.

The housing 202 represents a physical structure configured to protect the internal components of the hardware wallet 200. In the embodiment shown in FIGS. 2A-2B, the housing 202 includes a rectangular configuration with dimensions represented by height 208, length 210, and width 212. By way of an example, the housing 202 may have a height 208 between 5-12 centimeters, a length 210 between 3-8 cm, and a width between 0.5-2 cm. In other examples, the configuration and dimensions of the housing 202 can differ (e.g., circular, triangular). For example, the housing 202 can resemble a smart watch or another type of wearable computing device.

In addition, the housing 202 can be made out of one or more materials. Example materials may include, but are not limited to, plastics, metals, metal alloys. For instance, the housing 202 may include zinc and/or aluminum. In some embodiments, the design of the housing 202 can supplement the security features of the hardware 100. In particular, the housing 202 may be constructed such that access to interior components is limited without physical destruction of the hardware wallet 200 to some extent.

As shown in FIG. 2A, the hardware wallet 200 includes a GUI 204, which is a form of user interface that allows users to interact with the hardware wallet 200 through graphical icons. In particular, the actions in the GUI 204 can be performed through direct manipulation of the graphical elements via touch-controls. The GUI 204 can expand across a majority of the side of the hardware wallet 200. The size and dimensions of the GUI 204 can differ in other examples.

The camera 205 represents a front-facing image capturing component that can be positioned on the hardware wallet 200. The camera 205 may be used to capture images to add to the image dictionary, scan QR codes, or perform other actions. For example, the camera 205 may enable the hardware wallet 200 to use a face identification security feature (i.e., Face-ID). In particular, Face-ID may enable a user to access contents of the hardware wallet 200 via a process where the camera 205 scans and enables the hardware wallet 200 to recognize the user's face. In other embodiments, the hardware wallet 200 may not include the camera 205.

The USB port 206 represents a portion of the hardware wallet 200 where a USB cord can be connected to the hardware wallet 200. The USB cord can connect the hardware wallet 200 to another device or a power source to recharge an internal battery that supplies power to the hardware wallet 200. In some embodiments, the USB port 206 may only be used to connect the hardware wallet 200 to a power source.

FIG. 2B depicts a back view of the hardware wallet 200, according to one or more example embodiments. The back side of the hardware wallet 200 includes a power connection 214 and a camera 216. The power connection 214 may serve as port that enables a cord (not shown) to couple to a power source for charging. For example, a cord may be inserted at the power connection 214 to enable the hardware wallet 200 to receive electricity from a wall socket to charge one or more internal batteries within the hardware wallet 200. In other embodiments, the hardware wallet 200 may not include the power connection 214 and may use the USB port 206 to connect to a power source for recharging. In additional embodiments, the hardware wallet 200 may not include the USB port 206 and the power connection 214 and may use wireless charging to recharge one or more internal batteries (not shown). For instance, the hardware wallet 200 may be positioned on a wireless charging pad to recharge.

Similar to the camera 205 depicted in FIG. 2A, the camera 216 shown in FIG. 2B represents an image capturing component that can be positioned on the hardware wallet 200. The camera 216 may be used to capture images to add to the image dictionary, scan QR codes, or perform other actions. For instance, the QR codes can represent addresses, private keys, or a seed phrase for restoration, which the camera 216 can read and import. In other embodiments, the hardware wallet 200 may not include the camera 216. In further examples, the hardware wallet 200 may connect to an external camera via a wired or wireless connection.

FIG. 3 is a block diagram illustrating a blockchain wallet system, according to one or more example embodiments. The system 300 includes a hardware wallet 302 in communication with one or more mobile clients 304 that can connect to the blockchain corresponding to one or more digital currencies via the network 306.

The system 300 represents an example advanced blockchain wallet system that incorporates unique hardware and software features to improve ease of use while also providing increased security for private keys and blockchain transaction signatures implemented by the hardware wallet 302. Within the system 300, the hardware wallet 302 can be used to perform transactions for one or more digital currencies, such as Bitcoin or Ethereum. For example, the hardware wallet 302 may generate and securely store private keys that can be used to generate transaction data and digital signatures for executing transactions on the ledger (e.g., the blockchain) of a digital currency.

The hardware wallet 302 may engage in wired or wireless communication 312 with companion software on one or more mobile clients 304. For example, the hardware wallet 302 may connect via a wired USB connection to the mobile client 304. Alternatively, the hardware wallet 302 may use encrypted Bluetooth or other near field communications. For instance, the hardware wallet 302 can use a Wi-Fi direct encrypted channel, BLE, or other encryption wireless technologies.

In some embodiments, the settings of the hardware wallet 302 may be adjusted to permit establishing wireless connections only with mobile clients 304 located within a threshold distance from the hardware wallet 302. For example, prior to establishing a secure wireless connection with the smartphone 310, the hardware wallet 302 may perform a location comparison to determine if the smartphone 310 is within the threshold distance from the hardware wallet 302. As such, the comparison may involve obtaining and comparing the locations of the hardware wallet 302 and smartphone 310 or using some other near field communication technology.

In other embodiments, the system 300 may require the user to capture an image or use near field communication (NFC) as an added security feature when establishing a wireless connection between the hardware wallet 302 and the mobile client 304. For example, the system 300 may require the mobile client 304 to capture and transmit an image of a particular display shown on a GUI of the hardware wallet 302, such as a QR code.

The mobile clients 304 can provide ease of use in constructing ledger transactions for one or more digital currencies stored via the hardware wallet 302. Example mobile clients 304 can include computers (e.g., the computing device 308) or other Internet-capable devices (e.g., the smartphone 310 and wearable computing devices,). The mobile client 304 may serve as the connection to the network 306 via wired or wireless communication 314 (e.g., WiFi, LTE, 5G or another communication protocol) and enable the hardware wallet 302 to indirectly connect and communicate transactions to the network 306. For instance, the mobile client 304 may include companion software that allows the hardware wallet to execute and record transactions onto the ledger via the network 306.

As shown in FIG. 3, the network may 306 may correspond to the Internet or another network used for digital currency transactions. For example, the network 306 may enable the connected device, the mobile client 304, to connect to a blockchain for a specific digital currency (e.g., the Bitcoin blockchain). In some embodiments, the hardware wallet can use the network 306 to connect to other devices, such as other hardware wallets.

Figure 4A:
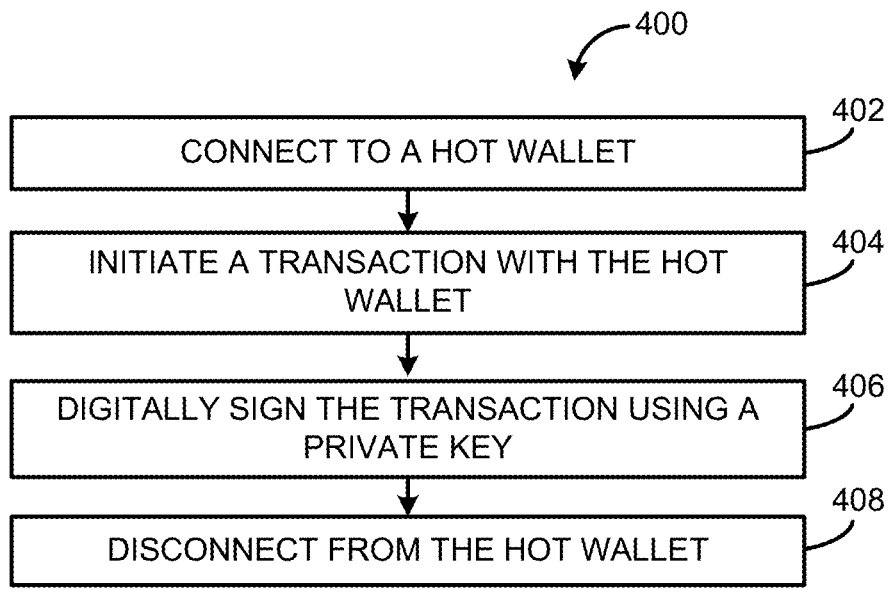
FIG. 4A is a flowchart of a method for executing a transaction with a hot wallet, according to one or more example embodiments.

FIG. 4A is a flowchart of a method 400 for performing a transaction between a hardware wallet and a hot wallet, according to one or more embodiments. The method 400 represents an example method that may include one or more operations, functions, or actions, as depicted by one or more of blocks 402, 404, 406, and 408, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

The method 400 as well as other methods presented herein may be performed by a processing system of a hardware wallet. In some examples, different steps of the method 400 may be performed by different processing units. For example, a general processing unit may establish connections while a CCP performs crypto-related operations.

At block 402, the method 400 involves connecting to a hot wallet. A hardware wallet's processing system may initially connect to a hot wallet operating on another device. For instance, the hot wallet may be supported by software operating on a mobile client capable of connecting to the Internet, such as a smartphone, laptop, wearable computing device, desktop computer, or another type of device.

In some embodiments, the hardware wallet's processing system may include multiple processing units with a general processing unit assigned to establish the connection with the hot wallet. The connection may be supported via a wired or wireless connection to the hot wallet. For example, the hardware wallet may be connected via wired connection (e.g., USB, micro-USB) to the device supporting the hardware wallet. In some instances, a wired connection may prevent external devices from interfering with the communication between the hardware wallet and the hot wallet. Alternatively, the hardware wallet may be connected via wireless connection (e.g., Bluetooth or BLE) to the Internet-connected device. The wireless connection may use one or more encryption techniques to increase the security of the wireless communication between the hardware wallet and the hot wallet. The hardware wallet may include components that enable both types of communication allowing the user to decide how to establish the connection. In some embodiments, the mobile client may connect with the hardware wallet using Bluetooth connectivity or by using QR codes and a camera.

At block 404, the method 400 involves initiating a transaction with the hot wallet. The transaction can be conducted at the hardware wallet via instructions input via an interface of the hardware wallet. For instance, the hardware wallet may receive transaction data from inputs at a GUI.

At block 406, the method 400 involves digitally signing the transaction using a private key. The transaction data can be digitally signed by the hardware wallet a way that the blockchain validating nodes would accept. The hardware wallet may store private keys in memory locally using one or more encryption techniques and use a private key for digitally signing the transaction. The hardware wallet transmits the signed transaction back to the hot wallet, which then can send the signed transaction over a communication network (e.g., the Internet) to the ledger (e.g., the blockchain nodes).

At block 408, the method 400 involves disconnecting from the hot wallet. In particular, the hardware wallet may disconnect from the hot wallet and store the private key and/or other transaction data locally at the hardware wallet offline. The processing system may include a CCP that specifically generates, uses, and stores the private key without exposing the key to other components of the processing system. In some examples, the hot wallet may subsequently communicate that transaction that occurred with the hardware wallet to the network.

Figure 4B:
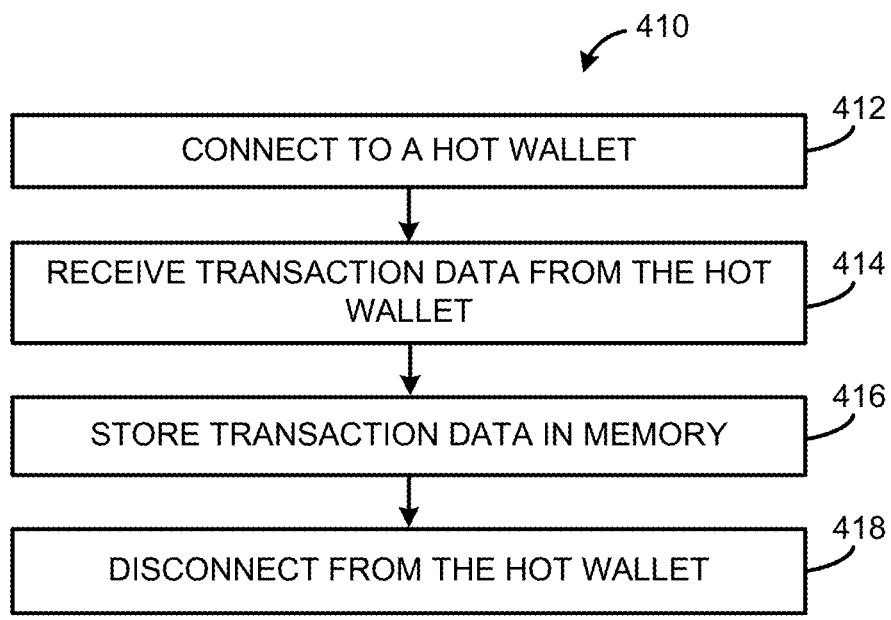
FIG. 4B is another flowchart of a method for storing transaction data from a hot wallet, according to one or more example embodiments.

FIG. 4B is another flowchart of a method 410 for receiving a transaction from a hot wallet, according to one or more embodiments. The method 410 represents an example method that may include one or more operations, functions, or actions, as depicted by one or more of blocks 412, 414, 416, and 418, each of which may be carried out by any of the systems shown in prior figures, among other possible systems.

At block 412, the method 410 involves connecting to a hot wallet. As discussed above, a hardware wallet may connect to other devices, such as a device with software that supports a hot wallet. At block 414, the method 410 involves receiving transaction data from the hot wallet. In particular, the hardware wallet may receive transaction data directly from the hot wallet via the secure connection established between the devices.

At block 416, the method 410 involves storing transaction data in memory. The hardware wallet may store transaction data securely within memory. In some instances, the data can be stored in a particular memory that is readable only by one or more processing units (e.g., a CCP).

At block 418, the method 410 involves disconnecting from the hot wallet. For instance, a general processing unit may disconnect the wireless connection between the hardware wallet and the hot wallet. Once disconnected, the hardware wallet can be completely offline and store the transaction data in cold storage.

Figure 4C:
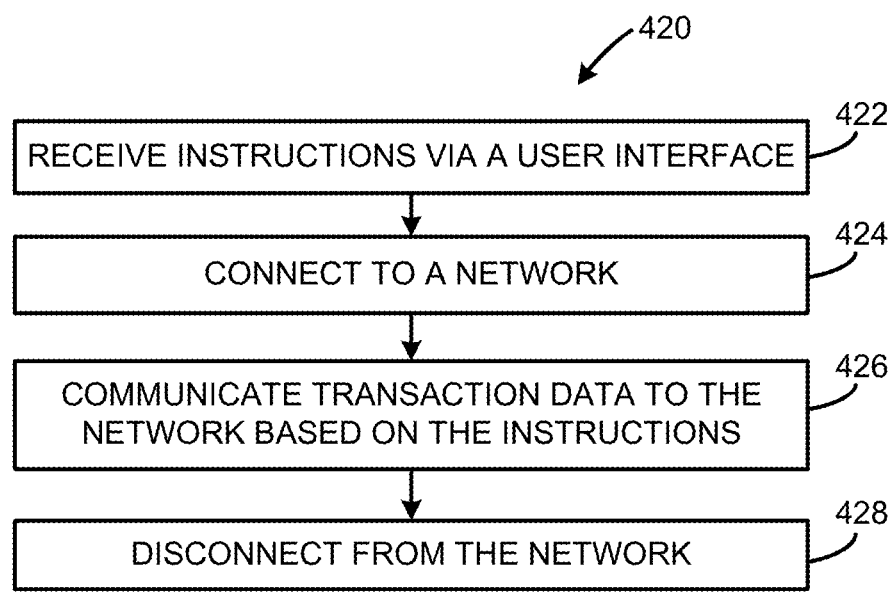
FIG. 4C is an additional flowchart of a method for executing a transaction directly to a network, according to one or more example embodiments.

FIG. 4C is an additional flowchart of a method for executing a transaction directly to a network, according to one or more example embodiments. The method 420 represents an example method that may include one or more operations, functions, or actions, as depicted by one or more of blocks 422, 424, 426, and 428, each of which may be carried out by any of the systems shown in prior figures, among other possible systems.

At block 422, the method 420 involves receiving instructions via a user interface. In particular, the hardware wallet may receive instructions in various ways. For example, the hardware wallet may receive touch inputs via a GUI or another interface or voice instructions via a microphone. The hardware wallet may include a speech recognition module capable of performing actions in response to detecting voice instructions.

At block 424, the method 420 involves connecting to a network. For example, a general processing unit may use a Wi-Fi system within the hardware wallet to connect the hardware wallet to the Internet. Alternatively, the hardware wallet may connect to the Internet using a cellular connection or another technology.

At block 426, the method 420 involves communicating transaction data to the network based on the instructions. The hardware wallet may communicate transaction data to the ledger of a digital currency via the network connection.

In some examples, a processing unit may receive signed transaction data from another processing unit within the hardware wallet. For example, a CCP within the hardware wallet may communicate transaction data to a general processing unit, which may subsequently communicate the transaction data to the digital currency's blockchain.

At block 428, the method 420 involves disconnecting from the network. Particularly, the hardware wallet may disconnect from the network to return to a cold storage state (i.e., offline).

Figure 5A:
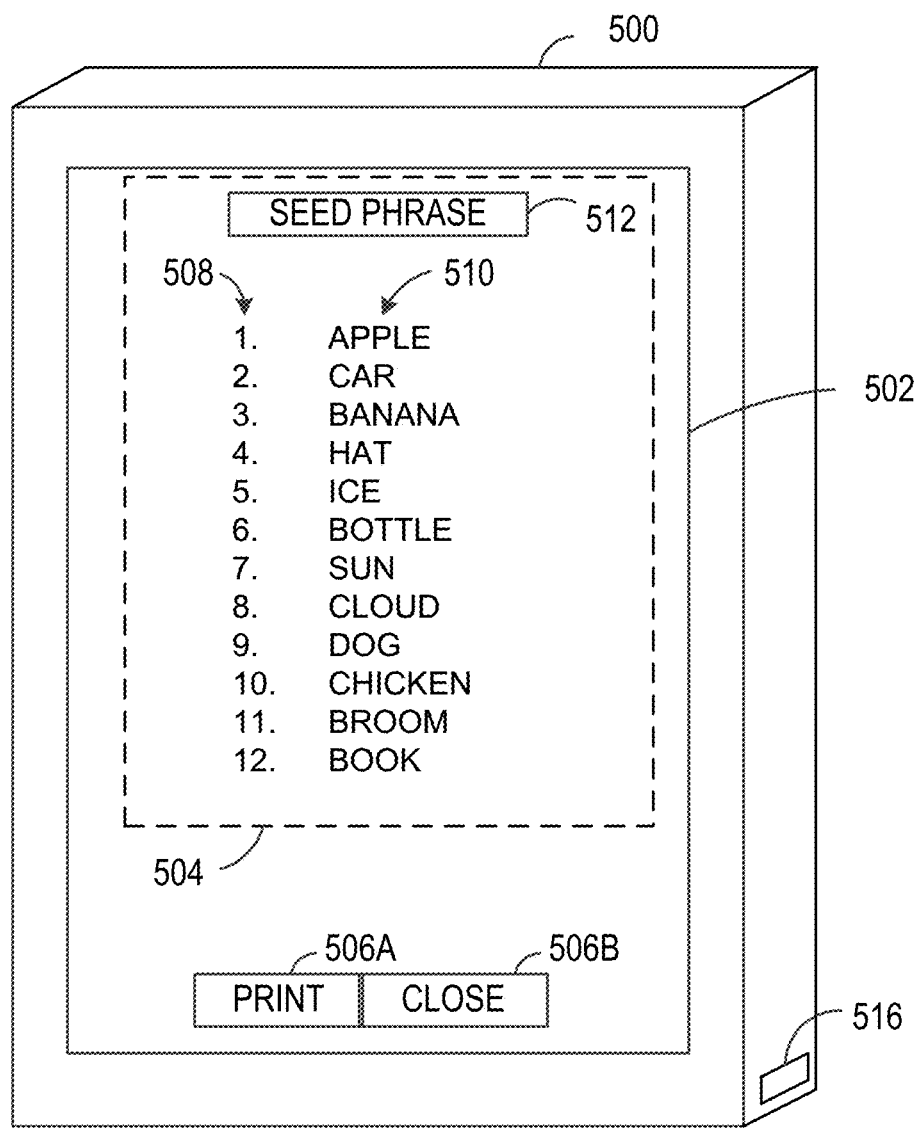
FIG. 5A illustrates a graphical user interface displaying a seed phrase as words arranged in a numerical order, according to one or more example embodiments.
Figure 5B:
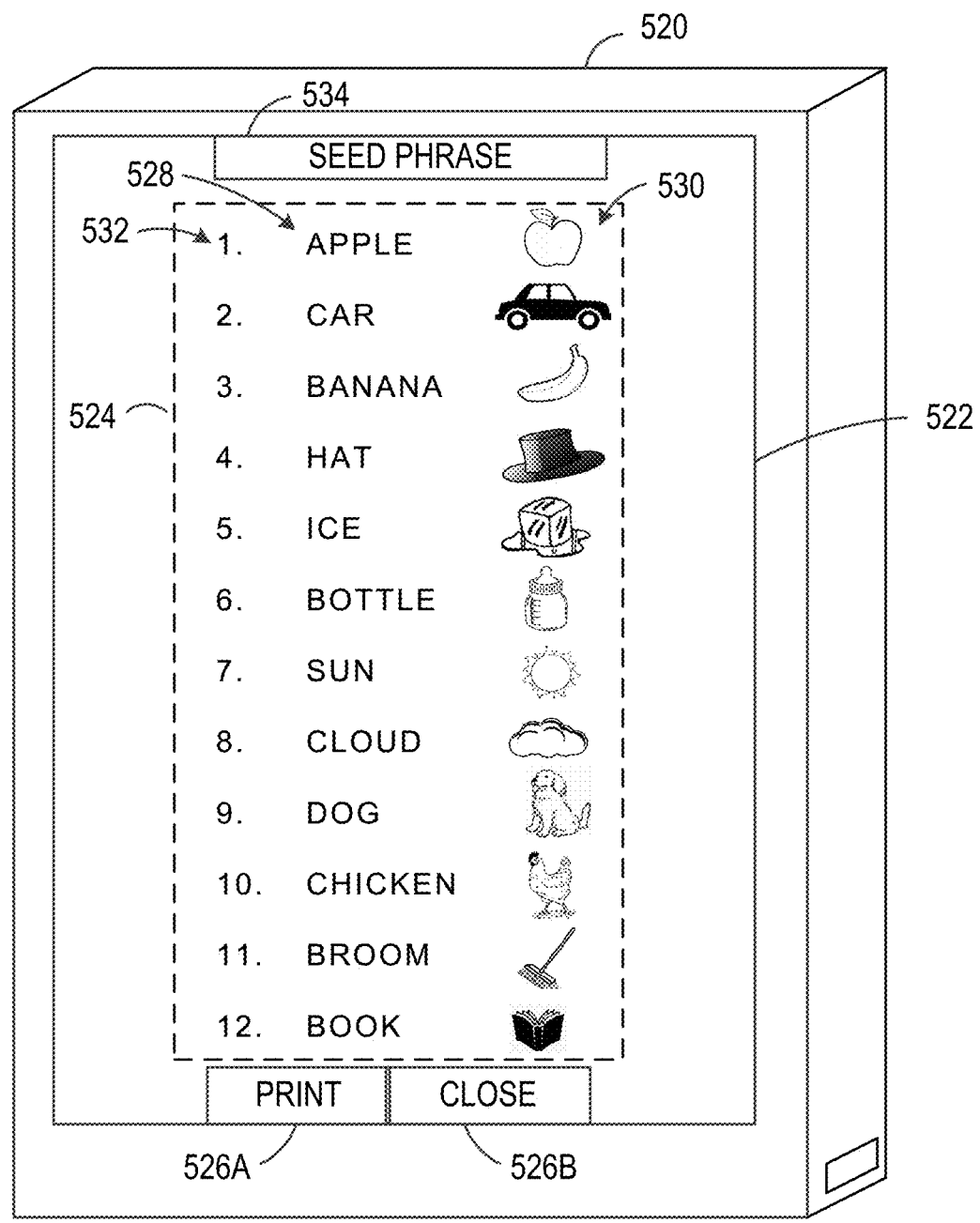
FIG. 5B illustrates a graphical user interface displaying the seed phrase with corresponding images, according to one or more example embodiments.

FIGS. 5A, 5B, and 5C illustrate the graphical user interface of a hardware wallet displaying a seed phrase in different ways. A seed phrase, also referred to as a seed recovery phrase or backup seed phrase, is typically a list of words which store the information needed to recover digital currency funds on the blockchain. Example hardware wallets presented herein can generate and display a seed phrase using a GUI, which can enable a user to record the seed phrase for subsequent use, if needed. For instance, the user may use the seed phrase to recover stored digital currency if the hardware wallet malfunctions or becomes corrupted. As such, the hardware wallet may generate and display the seed phrase using a word dictionary, an image dictionary, a QR code, or a combination. For example, the hardware wallet may include a CCP configured to generate the seed phrase using one or more sources (e.g., an image dictionary, data stored in memory). In further examples, the hardware wallet may also include one or more speakers or other components that can provide the seed phrase in an audio format.

FIG. 5A shows a hardware wallet 500 displaying all of the words 510 within a seed phrase 504 simultaneously using GUI 502. As shown, the GUI 502 may display the words 510 within the seed phrase 504 along with numbers 508 to indicate a numerical order that the words 510 should be input when used and a header 512 to enhance the user's experience. By displaying the entirety of the seed phrase 504 simultaneously along with the header 512, the hardware wallet 500 may help reduce confusion that a user may experience. The hardware wallet 500 may also configured to display words within the seed phrase 504 in other ways (e.g., a sequential order).

The hardware wallet 500 also provides options for selection via the GUI 502 or another input interface (e.g., a microphone), such as a print option 506A and a close option 506B. The hardware wallet 500 may initiate printing of the entire seed phrase 504 with or without its corresponding QR code using a connected printer upon detecting a selection of the print option 506A. A selection of the closing option 506B may cause the hardware wallet 500 to stop displaying the seed phrase 504 on the GUI 502. Other options may be also displayed within examples. In addition, the arrangement, size, and style of elements displayed on the GUI 502 can differ.

FIG. 5B shows a hardware wallet 520 displaying the seed phrase 524 using a combination of words 528 and corresponding images 530 via the GUI 522. The seed phrase 524 is shown with words 528 and images 530 arranged in an order represented by numbers 532. The images 530 depict the words 528 with both displayed to help the user to further understand the seed phrase 524. To generate the seed phrase 524, a CCP of the hardware wallet 520 may use an image dictionary to generate an image for each word making up the seed phrase 508. In some instances, the image dictionary may be stored locally at the hardware wallet 520. Alternatively, the hardware wallet 520 may access the images 530 via a connection with an external image dictionary. The hardware 520 may subsequently allow the user to enter in the words 528 or the images 530 in the order specified by the numbers 532 when inputting the seed phrase 524.

Similar to the embodiment shown in FIG. 5A, the hardware wallet 520 is also displaying a header 534 to convey that the seed phrase 524 is being shown using GUI 522. In addition, the hardware wallet 520 also shows a print option 526A and a close option 526B.

FIG. 5C shows a hardware wallet 540 displaying the seed phrase 548 as a QR code 544 using the GUI 542. The QR code 544 can be printed via a selection of the print option 546A when the hardware wallet 540 is connected to a printer. For instance, a camera on the hardware wallet 540 or another hardware wallet can scan the QR code 544 to input the seed phrase 548, which can save the user both time and effort. The hardware wallet 540 may also stop showing the QR code 544 via a selection of the close option 546B. In other embodiments, the hardware wallet 540 may display the seed phrase and a corresponding QR code representing the seed phrase at the same time.

FIG. 5D shows a hardware wallet 552 scanning a QR code 554. In particular, the hardware wallet 552 is shown using a camera to scan the QR code 554. The QR code 554 may represent a seed phrase associated with restoring the contents of the hardware wallet 552 or another hardware wallet. Alternatively, the QR code 554 may also be displayed on another device (e.g., a smartphone) to establish a secure connection between the hardware wallet 552 and the device. In addition, as further shown in FIG. 5D, the hardware wallet 552 may display a QR code copy 560 on the GUI 558 to indicate the scanning is complete to the user. In other embodiments, the QR code could also represent an account address, a public key, a private key, and/or a signed transaction, which can be displayed and/or printed. In addition, a QR code can also be used to pair the hardware wallet with the mobile client.

FIG. 6A illustrates a communication system for printing, according to one or more example embodiments. The system 600 involves a hardware wallet 602 engaging in direct communication 606 with a printer 604. In particular, the hardware wallet 602 may include one or more components that enable the direct connection to the printer 604. For example, a general processor of the hardware wallet 602 may use wireless communication (e.g., Bluetooth) to directly connect to the printer 604. This way, the hardware wallet 602 may enable a user to print a seed phrase or other data from the hardware wallet 602 via direction communication 606 without use of an intermediate device (e.g., a computer or a smartphone). In particular, the hardware wallet 602 may enable a user to print the seed phrase in various formats, such as words and images arranged in a numerical order or a QR code. Other data may include balances, account addresses, public keys, and hardware wallet serial number. The data can be in alphanumeric and/or QR code format. As another example, the hardware wallet 602 may use the connection to print a paper wallet containing a private key with a QR code.

In other examples, the hardware wallet 602 may communicate with other peripheral devices, such as scanners, cameras, storage drives, and external user interface components. For instance, the hardware wallet 602 may use an encrypted Bluetooth connection that can ensure undesired devices cannot read information transferred during the communication.

FIG. 6B illustrates a hardware wallet communication system, according to one or more example embodiments. As shown, hardware wallets 612, 614 may engage in wired or wireless communication 616 to share data. In some examples, hardware wallets 612, 614 may share saved files via the network.

In some embodiments, the unique digital address (or serial number) of each hardware wallet 612, 614 may be used when establishing the secure wireless connection. For instance, the hardware wallet 612 may use the unique digital address to initiate a connection with the hardware wallet 614. The identity of the sender and receiver could be stored in address books locally at each hardware wallet 612, 614 to prevent unwanted snooping of communications by third parties.

Figure 6C:
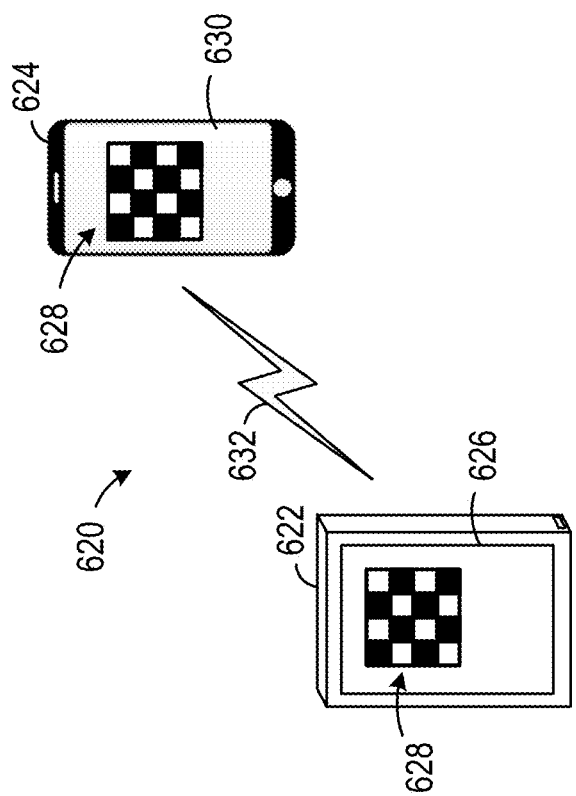
FIG. 6C depicts an additional system for secure communication between a hardware wallet and another device, according to one or more example embodiments.

FIG. 6C depicts a system 620 for secure communication 632 between a hardware wallet 622 and another device. In the embodiment shown, the system 620 includes the hardware wallet 622 wirelessly communicating 632 with a smartphone 624. In another embodiment, the hardware wallet 622 may connect to the smartphone 624 using a wired connection.

As shown in FIG. 6C, the GUI 626 on the hardware wallet 622 and the display 630 of the smartphone 624 are both displaying pattern 628 to enhance security associated with the wireless connection 632. In particular, the hardware wallet 622 may provide the pattern 628 for display on the smartphone 624 to enable a user to see that the wireless connection 632 is secure and not tampered. In other embodiments, the hardware wallet 622 may cause both devices to display a series of images or other information.

In addition, the pattern 628 may also be a QR code that either device can display to read to confirm a secure connection. The hardware wallet 622 can display the QR code and/or read the QR code from another device's display.

Figure 7:
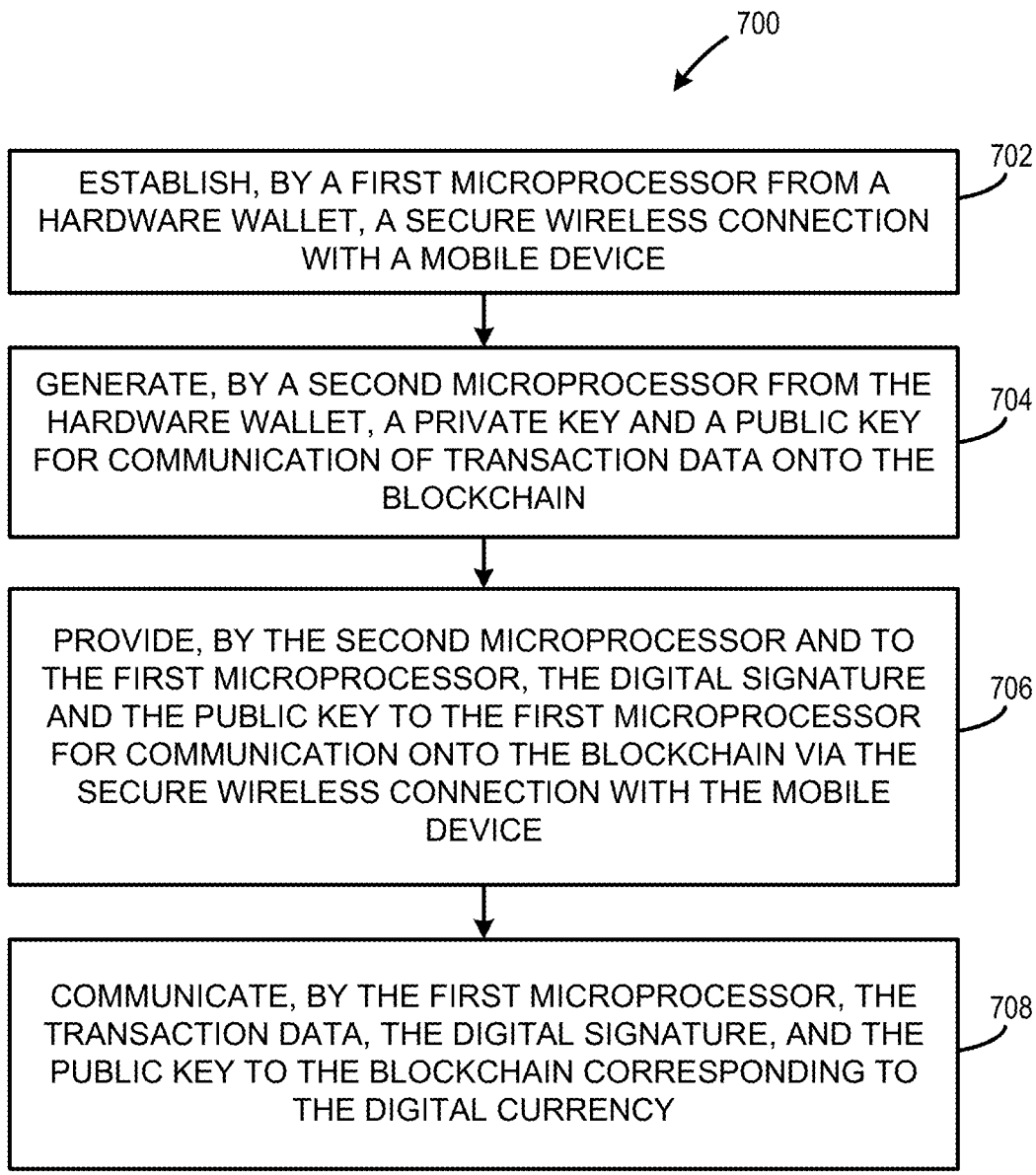
FIG. 7 illustrates another method, according to one or more example embodiments.

FIG. 7 shows another method 700, according to one or more embodiments.

Similar to the methods 400, 410, and 420 shown in FIGS. 4A-4C, the method 700 may be performed by a hardware wallet with multiple processing units (e.g., processors, microprocessors, or a combination).

At block 702, the method 700 involves establishing, by a first microprocessor from a hardware wallet, a secure wireless connection with a mobile device. The mobile device is connected to a network having access to a blockchain corresponding to a digital currency.

In some examples, the first microprocessor is configured to establish the secure wireless connection with the mobile device via an encrypted Bluetooth channel (or BLE). As such, the first microprocessor may maintain exclusive control of a Bluetooth radio that enables the encrypted Bluetooth channel (or BLE).

In further examples, the first microprocessor may cause the GUI to display a QR code. In particular, capturing an image of the QR code via a camera of the mobile device can be part of establishing the secure wireless connection between the hardware wallet and the mobile device. In addition, the first microprocessor may also be configured to provide, via the GUI, an interface for receiving a security code input and provide access to the hardware wallet only responsive to receiving the security code input. The security code input can be a biometric input, numerical input, or some other form of input (e.g., two factor identification).

At block 704, the method 700 involves generating, by a second microprocessor from the hardware wallet, a private key and a public key for communication of transaction data onto the blockchain. The second microprocessor initially uses a hash function and the private key to generate transaction data and a digital signature independent from the first microprocessor.

In some examples, the second microprocessor includes a unique permanent digital address. In particular, the second microprocessor can use the unique permanent digital address to convey an identification of the hardware wallet to an external source. For instance, the second microprocessor can be configured to provide an indication of the unique permanent digital address to the first microprocessor. The first microprocessor can establish a second secure wireless connection with a second hardware wallet using the indication of the unique permanent digital address.

At block 706, the method 700 involves providing, by the second microprocessor and to the first microprocessor, the transaction data, the digital signature, and the public key to the first microprocessor for communication onto the blockchain via the secure wireless connection with the mobile device. For example, the second microprocessor may provide the transaction data, the digital signature, and the public key to the microprocessor responsive to generating the private key and the public key.

At block 708, the method 700 involves communicating, by the first microprocessor, the transaction data, the digital signature, and the public key to the blockchain corresponding to the digital currency.

In some examples, the second microprocessor may further include access to a unique permanent digital address that can convey a unique identification for the hardware wallet. This can be used to convey the identity to other devices.

In some examples, the second microprocessor may further provide the seed phrase as a QR code to the first microprocessor. The first microprocessor may further establish a secure wireless connection with a printer and cause the printer to print the seed phrase as the QR code using the second wireless connection. As such, a hardware wallet may scan the QR code to enable a restoration of contents of the hardware wallet.

In some examples, the first microprocessor is configured to obtain a firmware update via the secure wireless connection. For example, the first microprocessor can obtain the firmware update in an encrypted format that includes the unique permanent digital address and a corresponding digital signature. The first microprocessor can compare the unique permanent digital address and the corresponding digital signature of the firmware update in the encrypted format to check for tampering prior to updating the hardware wallet using the firmware update. For instance, the first microprocessor may identify the unique permanent digital address the firmware update in the encrypted format prior to updating the hardware wallet using the firmware update.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a hardware wallet such as the hardware wallet 100 of FIG. 1 may be configured to provide various operations, functions, or actions in response to the programming instructions 804 conveyed to the hardware wallet by one or more of the computer readable medium 806, the computer recordable medium 808, and/or the communications medium 810.

The non-transitory computer readable medium could also be distributed among multiple data storage elements, which could be remotely located from each other. Alternatively, the computing device that executes some or all of the stored instructions could be another computing device, such as a server.

Implementations of this disclosure provide technological improvements that are particular to computer technology, for example, those concerning analysis of large scale data files with thousands of parameters. Computer-specific technological problems, such as enabling formatting of data into normalized forms for parameter reasonability analysis, can be wholly or partially solved by implementations of this disclosure. For example, implementation of this disclosure allows for data received from many different types of sensors to be formatted and reviewed for accuracy and reasonableness in a very efficient manner, rather than using manual inspection. Source data files including outputs from the different types of sensors, such as outputs concatenated together in the single file, can be processed together by one computing device in one computing processing transaction, rather than by separate devices per sensor output or by separate computing transactions. This is also very beneficial to enable review and comparisons of combinations of outputs of the different sensors to provide further insight into reasonableness of the data that cannot be performed when processing sensor outputs individually. Implementations of this disclosure can thus introduce new and efficient improvements in the ways in which data is analyzed by selectively applying appropriate translation maps to the data for batch processing of sensor outputs.

The systems and methods of the present disclosure further address problems particular to computer networks, for example, those concerning the processing of source file(s) including data received from various sensors for comparison with expected data (generated as a result of cause-and-effect analysis per each sensor reading) as found within multiple databases. These computing network-specific issues can be solved by implementations of the present disclosure. For example, by identifying a translation map and applying the map to the data, a common format can be associated with multiple source files for a more efficient reasonability check. The source file can be processed using substantially fewer resources than as currently performed manually, and increases accuracy levels due to usage of a parameter rules database that can otherwise be applied to the normalized data. The implementations of the present disclosure thus introduce new and efficient improvements in the ways in which databases can be applied to data in source data files to improve a speed and/or efficiency of one or more processor-based systems configured to support or utilize the databases.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A hardware wallet comprising:
a first microprocessor;
a first non-transitory memory containing instructions, that when executed by the first microprocessor, causes the first microprocessor to perform operations comprising:
establishing a secure wireless connection with a mobile device, wherein the mobile device is connected to a network having access to a blockchain corresponding to a digital currency;
communicating transaction data for the blockchain via the secure wireless connection with the mobile device;
a second microprocessor; and
a second non-transitory memory containing instructions, that when executed by the second microprocessor, causes the second microprocessor to perform operations comprising:
generating a private key and a public key;
encrypting transaction data using a hash function and the private key;
producing a digital signature independent from the first microprocessor;
transmitting the produced digital signature and the generated public key to the first microprocessor;
encrypting the private key; and
storing the encrypted private key securely within a storage unit such that the private key is readable only by the second microprocessor.

2. The hardware wallet of claim 1, wherein the first microprocessor performs operations comprising:
establishing the secure wireless connection with the mobile device via an encrypted Bluetooth channel; and
maintaining exclusive control of a Bluetooth radio that enables the encrypted Bluetooth channel.

3. The hardware wallet of claim 1, further comprising:
a graphical user interface (GUI); and
wherein the first microprocessor: further performs operations comprising:
causing the GUI to display a Quick Response (QR) code, wherein capturing an image of the QR code via a camera of the mobile device enables establishing the secure wireless connection between the hardware wallet and the mobile device.

4. The hardware wallet of claim 3, wherein the first microprocessor further performs operations comprising:
providing , via the GUI, an interface for receiving a security code input; and providing access to the hardware wallet.

5. The hardware wallet of claim 4, wherein the second microprocessor further performs operations comprising:
generating a seed phrase, and
causing all words of the seed phrase to display simultaneously via the GUI.

6. The hardware wallet of claim 5, wherein the second microprocessor further performs operations comprising:
providing the seed phrase as a QR code to the first microprocessor,
wherein first microprocessor further performs operations comprising:
establishing a second secure wireless connection with a printer; and
causing the printer to print the seed phrase as the QR code using the second secure
wireless connection, wherein scanning the QR code enables restoration of contents of the hardware wallet.

7. The hardware wallet of claim 1, wherein the second microprocessor further performs operations comprising:
generating the private key and the public key using elliptic curve cryptography.

8. The hardware wallet of claim 1, wherein the second microprocessor further performs operations comprising:
generating the private key and the public key using a high entropy random number generator.

9. The hardware wallet of claim 1, wherein the first microprocessor further performs operations comprising:
using the public key to execute transactions on the blockchain via the secure wireless connection.

10. The hardware wallet of claim 1, wherein the first microprocessor and the second microprocessor are positioned on a semiconductor chip.

11. The hardware wallet of claim 1, wherein the second microprocessor further performs operations comprising:
generating a plurality of key pairs, wherein each key pair exists in a different format such that the plurality of key pairs include a plurality of formats, and wherein the plurality of key pairs includes the private key and the public key.

12. The hardware wallet of claim 1, wherein the second microprocessor includes a unique permanent digital address, wherein the second microprocessor further performs operations comprising:
using the unique permanent digital address to convey an identification of the hardware wallet to an external source.

13. The hardware wallet of claim 12, wherein the second microprocessor further performs operations comprising:
providing an indication of the unique permanent digital address to the first microprocessor, and
wherein the first microprocessor further performs operations comprising:
establishing, aa second secure wireless connection with a second hardware wallet using the indication of the unique permanent digital address.

14. The hardware wallet of claim 13, wherein the first microprocessor further performs operations comprising:
obtaining, a firmware update, via the secure wireless connection, in an encrypted format that includes the unique permanent digital address and a corresponding digital signature; and
comparing the unique permanent digital address and the corresponding digital signature of the firmware update in the encrypted format to check for tampering prior to updating the hardware wallet using the firmware update.

15. The hardware wallet of claim 14, wherein the first microprocessor further performs operations comprising:
identifying the unique permanent digital address the firmware update in the encrypted format prior to updating the hardware wallet using the firmware update.

16. A system comprising:
a mobile device connected to a network, wherein the network includes access to a blockchain corresponding to a digital currency; and
a hardware wallet comprising
a first microprocessor;
a first non-transitory memory containing instructions, that when executed by the first microprocessor, causes the first microprocessor to perform operations comprising:
establishing a secure wireless connection with the mobile device,
communicating transaction data for the blockchain via the secure wireless connection with the mobile device;
a second microprocessor; and
a second non-transitory memory containing instructions, that when executed by the second microprocessor, causes the second microprocessor to perform operations comprising:
generating a private key and a public key;
encrypting transaction data using a hash function and the private key;
producing a digital signature independent from the first microprocessor;
transmitting the produced digital signature and the generated public key to the first microprocessor;
encrypting the private key; and
storing the encrypted private key securely within a storage unit such that the private key is readable only by the second microprocessor.

17. The system of claim 16, further comprising:
a printer; and
wherein the second microprocessor further performs operations comprising: providing a seed phrase to the first microprocessor, and
wherein the first microprocessor further performs operations comprising:
establishing a second secure wireless connection with the printer; and
causing the printer to print the seed phrase using the second secure wireless connection.

18. A method comprising:
establishing, by a first microprocessor from a hardware wallet, a secure wireless connection with a mobile device, wherein the mobile device is connected to a network having access to a blockchain corresponding to a digital currency;
generating, by a second microprocessor from the hardware wallet, a private key and a public key;
encrypting transaction data using a hash function and the private key;
producing a digital signature independent from the first microprocessor;
transmitting the produced digital signature and the generated public key to the first microprocessor;
storing the encrypted private key securely within a storage unit such that the private key is readable only by the second microprocessor; and
communicating, by the first microprocessor, the transaction data, the digital signature, and the public key to the blockchain corresponding to the digital currency.

19. The method of claim 18, wherein establishing the secure wireless connection with the mobile device comprises:
- determining a distance between the hardware wallet and the mobile device; and
- based on the distance, initiating a wireless connection with the mobile device.

\* \* \* \* \*